United States Patent
Locker et al.

(10) Patent No.: US 9,064,054 B2
(45) Date of Patent: Jun. 23, 2015

(54) SYNCHRONIZING EXECUTION OF A TESTING APPLICATION

(75) Inventors: Jiří Locker, Bílovice nad Svitavou (CZ); Lukáš Petrovický, Most (CZ)

(73) Assignee: Red Hat, Inc., Raleigh, NC (US)

( * ) Notice: Subject to any disclaimer, the term of this patent is extended or adjusted under 35 U.S.C. 154(b) by 484 days.

(21) Appl. No.: 12/981,188

(22) Filed: Dec. 29, 2010

(65) Prior Publication Data

US 2012/0174067 A1 Jul. 5, 2012

(51) Int. Cl.
*G06F 9/44* (2006.01)
*G06F 11/36* (2006.01)

(52) U.S. Cl.
CPC .................. *G06F 11/3688* (2013.01)

(58) Field of Classification Search
CPC .................................... G06F 11/3688
USPC .......................................... 717/124
See application file for complete search history.

(56) References Cited

U.S. PATENT DOCUMENTS

| | | | | |
|---|---|---|---|---|
| 6,023,773 A * | 2/2000 | O'Donnell et al. | ............. | 714/40 |
| 6,185,701 B1 * | 2/2001 | Marullo et al. | ............. | 714/38.14 |
| 6,324,492 B1 * | 11/2001 | Rowe | ................. | 703/13 |
| 6,567,767 B1 * | 5/2003 | Mackey et al. | ................ | 702/186 |
| 6,907,546 B1 * | 6/2005 | Haswell et al. | ............. | 714/38.11 |
| 6,993,747 B1 * | 1/2006 | Friedman | ..................... | 717/124 |
| 7,055,137 B2 * | 5/2006 | Mathews | ....................... | 717/125 |
| 7,334,162 B1 * | 2/2008 | Vakrat et al. | ................. | 714/38.1 |
| 7,490,319 B2 * | 2/2009 | Blackwell et al. | ............. | 717/124 |
| 7,680,917 B2 * | 3/2010 | Silvert | ......................... | 709/223 |
| 7,823,023 B2 * | 10/2010 | Kwan et al. | ................... | 714/38.1 |
| 7,840,851 B2 * | 11/2010 | Hayutin | .......................... | 714/46 |
| 7,844,861 B2 * | 11/2010 | Hegarty et al. | ................. | 714/46 |
| 8,185,910 B2 * | 5/2012 | Swildens | ....................... | 719/310 |
| 8,302,080 B2 * | 10/2012 | Wassermann et al. | ........ | 717/131 |
| 2003/0081560 A1 * | 5/2003 | Honda | ........................... | 370/252 |
| 2005/0005198 A1 * | 1/2005 | Vakrat et al. | .................... | 714/37 |
| 2007/0168970 A1 * | 7/2007 | Li et al. | ......................... | 717/124 |
| 2009/0133000 A1 * | 5/2009 | Sweis et al. | ................... | 717/124 |
| 2009/0150867 A1 * | 6/2009 | Vorungati | ...................... | 717/124 |
| 2009/0254329 A1 * | 10/2009 | Thakkar | ........................... | 703/13 |
| 2010/0251217 A1 * | 9/2010 | Miller | ............................ | 717/126 |
| 2010/0332535 A1 * | 12/2010 | Weizman et al. | .............. | 707/770 |
| 2012/0023484 A1 * | 1/2012 | Demant et al. | ................ | 717/125 |
| 2012/0174067 A1 * | 7/2012 | Locker et al. | .................. | 717/124 |

\* cited by examiner

*Primary Examiner* — Don Wong
*Assistant Examiner* — Theodore Hebert
(74) *Attorney, Agent, or Firm* — Lowenstein Sandler LLP (57) ABSTRACT

A method and apparatus for synchronizing execution of a test application is described. In one embodiment, the method includes receiving two or more commands from a test application. The method may also include distributing a first command from the received two or more commands to a plurality of client computer systems, each client computer system to issue the first command to a server computer system. Furthermore, the method may include distributing a second command from the received two or more commands to the plurality of client computer systems after receipt of a response to the first command from each of the plurality of client computer systems.

20 Claims, 5 Drawing Sheets

SYNCHRONIZING EXECUTION OF A TESTING APPLICATION

TECHNICAL FIELD

Embodiments of the invention relate to the field of application testing, and more particularly, to synchronizing execution of a graphical user interface test application at a plurality of client computer systems.

BACKGROUND

Client-server applications are distributed software systems that typically include a central server that provides services to a number of clients. The services are provided by sending data between clients and the server. When a client needs a service, it sends a request to the server. The server processes the request and sends an answer back to the client.

Automated functional user interface testing is a kind of testing that simulates a user operating on an application's user interface (UI) and verifies its functionality. The key component of such tests is a program library that is able to simulate a real user input by triggering events associated with actions like clicking mouse buttons or typing text. The test follows a given test case by using the application programming interface (API) of the library and verifies that the UI responds as expected.

In a client-server application framework, timing issues arise when testing an application. For example, users may be enabled by a client application to import files into a database on a server. The database is shared for the client-server application, and users may overwrite other users' files by using the same file name. If more than one requests to import a file of the same name arrives at the server at the same time, only the first import request will succeed. The rest of the import requests cannot be satisfied and their originators will be notified by the server that the operation failed. Thus, in order to test such error conditions in a client-side application, the timing and distribution of client application requests becomes crucial.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and apparatus for synchronizing execution of a test application is described. In one embodiment, the method includes receiving two or more commands from a test application. The method may also include distributing a first command from the received two or more commands to a plurality of client computer systems, each client computer system to issue the first command to a server computer system. Furthermore, the method may include distributing a second command from the received two or more commands to the plurality of client computer systems after receipt of a response to the first command from each of the plurality of client computer systems.

Figure 1:
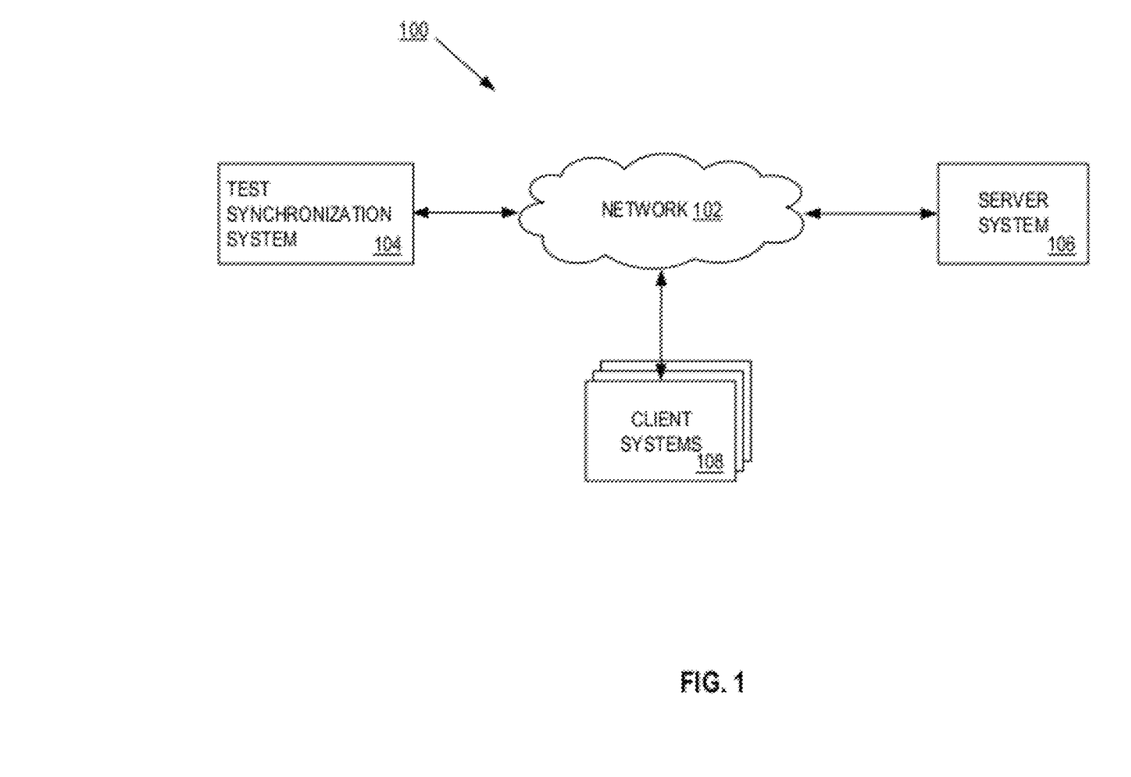
FIG. 1 is a block diagram of exemplary system architecture for a test synchronization system.

FIG. 1 is a block diagram of exemplary system architecture 100 for a test synchronization system. In one embodiment, the system architecture 100 includes client systems 108, test synchronization system 104, and server system 106. In one embodiment, the client systems 108, test synchronization system 104, and server system 106 may include one or more computing devices such as server computers, desktop computers, laptop computer systems, netbooks, etc. Furthermore, the client systems 108, test synchronization system 104, and server system 106 may be coupled to a computer network 104 that communicates via any of the standard protocols for the exchange of information. The computer network 104 may be a private network (e.g., a local area network (LAN), etc.) or a public network (e.g., Internet, etc.).

In one embodiment, client systems 108 execute a client-based application for interacting with server system 106. In one embodiment, the client-based application is a graphical user interface (GUI) based application that enables a user of a client system to interact with data at the server system 106. For example, the client-based application may provide a GUI that enables a user to access a database, manage files, or any other web-based application in order to access data, add data, delete data, etc. from the server system 106 via standard user interface commands such as mouse clicks, typed commands, mouse-overs, etc.

In one embodiment, a plurality of client systems 108 execute the same GUI-based application, or different GUI applications, for interacting with the server system 106. Because two or more client systems 108 may perform the same action on data maintained by the server system 106, an error condition might arise. For example, two client systems may display a listing of files stored on server system 106. When a first client system deletes a file via the client's GUI interface to server system 106, that file is no longer available at server system 106 to any client systems. However, a second client system that is displaying files at the server system 106 may not have been refreshed to reflect the first client system's deletion of the file. When the second client system then seeks to perform an action on the file, such as access the file, transfer the file, delete the file, etc., the second client will receive an error message for attempting to perform an action on a file that does not exist.

In one embodiment, test synchronization system 104 is responsible for synchronizing the execution of testing application commands at a plurality of client computer systems, such as client systems 108. In one embodiment, test synchronization system 104 distributes test commands to client systems 108 in order to cause, and therefore test, error conditions at client systems 108. In the example discussed above, a time-dependent error occurred when a client system attempted to access a file after the file had been deleted from the server system 106.

As discussed in greater detail below, test synchronization system 104 manages testing commands so that the client systems 108 will execute commands for a test application in parallel. That is, in one embodiment, test synchronization system 104 ensures that the same commands/actions are performed by each of the plurality of client systems 108 at the same time, or within a very small margin of time.

Figure 2:
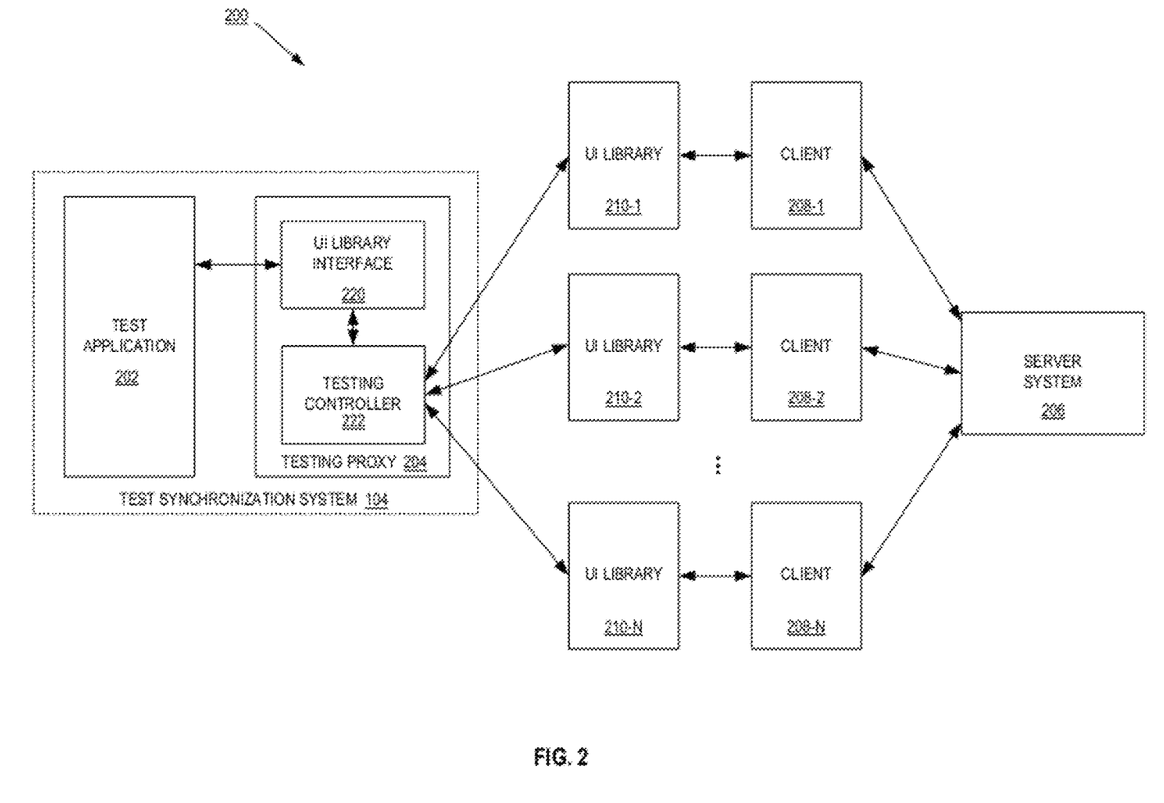
FIG. 2 is a block diagram of one embodiment of a test synchronization system.

FIG. 2 is a block diagram of one embodiment of a system 200 for synchronizing test commands. In one embodiment, system 200 provides additional details to the architecture discussed above with respect to FIG. 1.

In one embodiment, test synchronization system 104 includes a testing proxy 204 that interacts with a test application 202. In one embodiment, test application 202 is software code written to interface with the graphical user interface (GUI) library of a client computer system. In one embodiment, the test application 202 operates on the user interface library to simulate user actions, such as mouse clicking on a GUI interface of a client application, entering text, executing commands, accessing files, deleting files, transferring files, etc. In one embodiment, the test application 202 is written to interface with a single client computer system.

In one embodiment, the test application 202 is written in a computer language corresponding to the UI library 210. That is, the UI library simulates user actions that may be taken on a client 208 application's GUI. For example, the test application 202 may be a JAVA™ based testing application driving a UI library written in JAVA to test a web based GUI run on a client computer system. In one embodiment, test application 202 resides on test system 104 and interacts with testing proxy 204. In another embodiment, test application 202 is executed at a remote location and interacts with testing proxy 204 via a network, such as network 102 of FIG. 1.

In one embodiment, testing proxy 204 receives test commands from test application 202 in order to distribute and synchronize execution of the received testing commands among a plurality of client computer systems, such as clients 208-1 to 208-N. In one embodiment, testing proxy 204 includes a user interface (UI) library interface 220 that receives test commands (e.g., simulated mouse clicks, keystrokes, execution requests, etc.) from test application 202. In one embodiment, UI library interface 220 simulates a client-based user interface (UI) library, such as UI library 210-1 through 210-N. In one embodiment, UI library interface 220 simulates a client UI library so that test application 202 needs only be written as if a test application were to be executed on a single client computing system.

In one embodiment, test synchronization proxy 204 ensures the sequential commands of a test program, such as test application 202, are each synchronized for execution in parallel. In one embodiment, test synchronization proxy 204 synchronizes execution of test application 202 commands at a plurality of client systems, a plurality of libraries, etc. Although test synchronization proxy 204 is described herein with respect to a test application for a user interface library, test synchronization proxy 204 may be utilized to synchronize testing between any test application and a library whose functions/commands the test application are to invoke.

In one embodiment, testing controller 222 is responsible for distributing and scheduling the synchronous execution of test commands at a plurality of client computer systems. Because test controller 222 distributes and synchronizes test commands, the writing of a test application is simplified so that distribution of commands, synchronizing distribution of commands, scheduling commands, etc. need not be coded in the test application.

In one embodiment, testing controller 222 synchronizes the distribution, and therefore execution, of test commands from the test application 202. In one embodiment, for each test command of the test application 202, testing controller 222 distributes the same test command to each of a plurality of clients 208 via a UI library 210 of the clients 208. For example, testing controller may distribute the same mouse click, file access request, file deletion request, file rename request, upload/download request, etc. as specified in test application 202 to each client 208 to simulate an end-user of a client computer system entering the command in a graphical user interface (GUI). In one embodiment, the same command is provided at the same time by testing controller 222 to each client 208. Each client computer system 208-1 through N executes the test application command to interact with server system 206. Because the testing controller 222 distributed the command to each client 208 at the same time, each client will in turn execute the command to interact with the server system 206 at the same time.

In one embodiment, synchronous distribution and execution of test commands will cause error conditions to be encountered by one or more of client systems 208-1 through N. In the example discussed above, where a file has been deleted on the server system 206 by a first client computer system (e.g., client 208-1), other client computer systems (e.g., clients 208-2 through 208-N) that attempt to delete the same file will receive error messages. In one embodiment, testing controller 222 reports the error messages displayed by the UI libraries 210 to the test application 202 via the UI library interface 220. Thus, test application 202, which may be written as if to be executed on a single client system, may receive error messages from parallel and synchronous execution of test commands at a plurality of clients 208.

In one embodiment, testing controller 222 further waits to receive responses from all clients 208-1 through 208-N before distributing a next command in the test application 202. Testing controller 222 waits for responses from each client 208 for each distributed test command, before sending out a next test command to each of the client systems, to facilitate the parallel execution of all commands from a test application. In one embodiment, the parallel distribution of the same commands at the same time enables the testing of time-based errors at client GUI-based applications for interacting with a server system 206.

Figure 3:
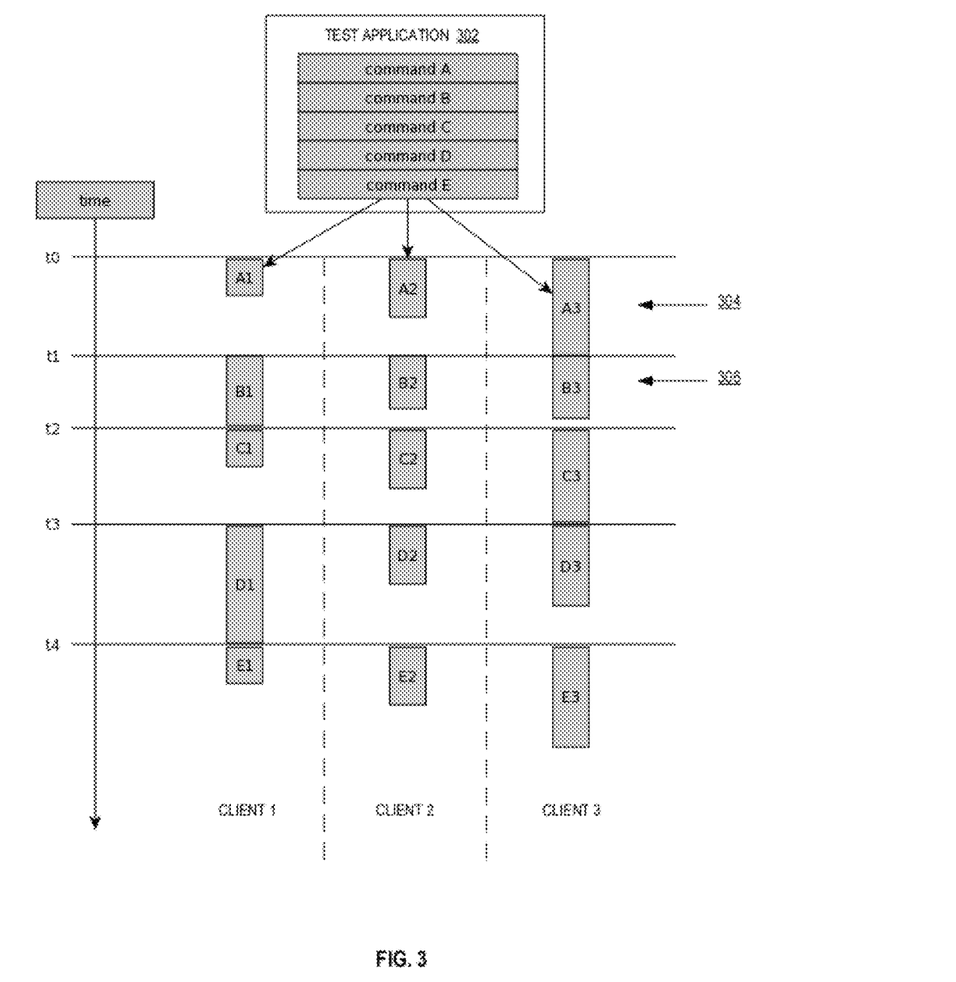
FIG. 3 illustrates one embodiment of testing application commands synchronized by a test synchronization system.

FIG. 3 illustrates one embodiment of testing application commands synchronized by a test synchronization system. As discussed above, a test application 302 may include several commands that simulate user interactions with a graphical user interface, such as mouse clicks, mouse overs, text entry, command execution requests, etc. In one embodiment, a testing proxy 204 interacts with the test application 302 as discussed above in FIG. 2 in order to distribute and synchronize the execution of test commands among a plurality of client computer systems. Furthermore, as discussed above, test synchronization proxy 204 may be utilized to synchronize testing between any test application and a library whose functions/commands the test application are to invoke.

In one embodiment, the commands (i.e., command A, command B, command C, etc.) of test application 302 may be received by UI library interface 220 and provided to testing controller 222. In one embodiment, testing controller 222 distributes a command, such as command A, to three client computer systems at time t0 304. As is illustrated, different client computer systems may take different amounts of time to execute command A.

In one embodiment, testing controller 222 waits for each client computer system to finish execution of command A before distributing command B to the three client computer systems at time t1 306. In one embodiment, testing controller 222 continues to synchronize the distribution, and thus parallel execution, of the same command at the same time to each of the client computer systems.

Figure 4:
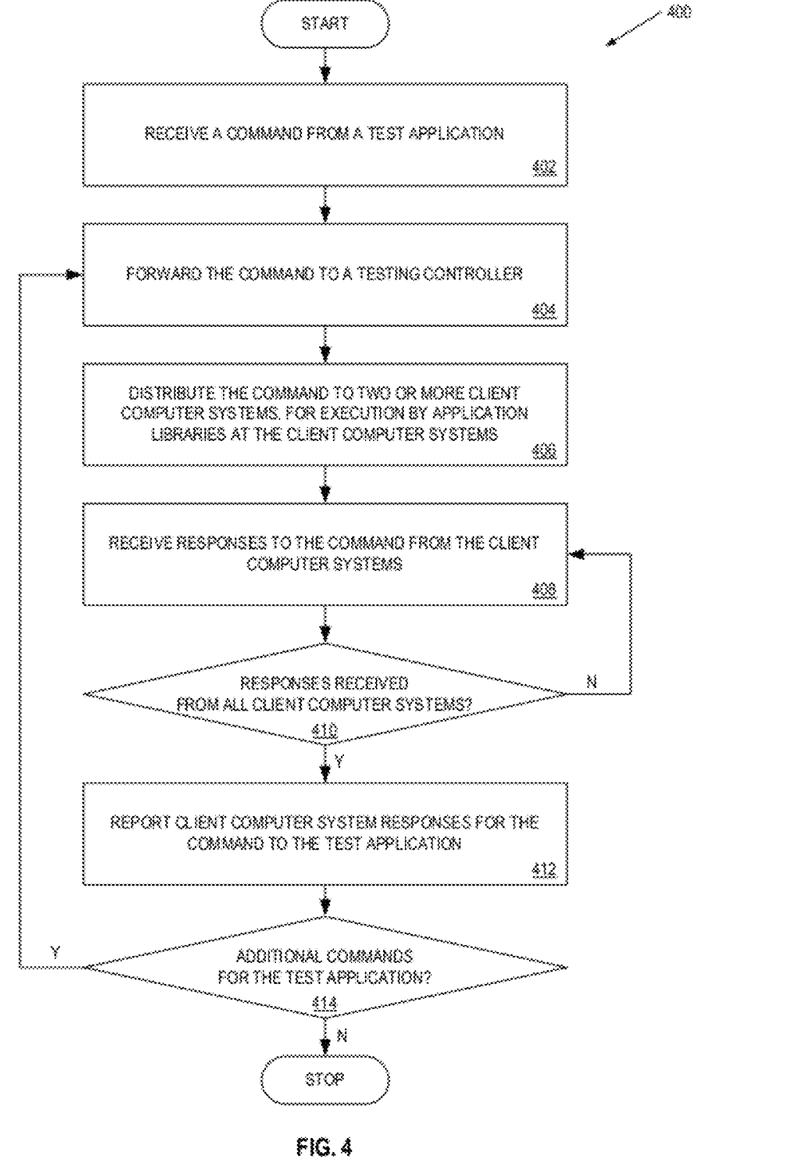
FIG. 4 is a flow diagram of one embodiment of a method for synchronizing testing application commands executed by a plurality of client computer systems.

FIG. 4 is a flow diagram of one embodiment of a method 400 for synchronizing testing application commands. The method 400 is performed by processing logic that may comprise hardware (circuitry, dedicated logic, etc.), software (such as is run on a general purpose computer system or a dedicated machine), firmware, or a combination. In one embodiment, the method 400 is performed by testing proxy 204 of FIG. 2.

Referring to FIG. 4, the process begins by receiving a command from a test application (processing block 402). In one embodiment, the test application is a software application that simulates a user's interactions with a graphical user interface. In one embodiment, the user interface commands simulate common user interactions with an application, such as user mouse clicks, text entry, etc. In one embodiment, the user interface command received from the test application is a single command to be executed by a single client computer system.

Processing logic forwards the command to a testing controller (processing block 404). In one embodiment, the command is distributed to two or more client computer systems, for execution by application libraries on the client computer systems (processing block 406). In one embodiment, the command is replicated for distribution to multiple client computer systems at the same time. In one embodiment, because processing logic replicates and distributes the command a the same time, the command may be executed in parallel by the client computer systems. In one embodiment, the command causes the client computer systems to interact with a server computer system. Exemplary interactions with the server computer systems may include the client computer systems attempting to access files stored on the server computer system, delete files from the server computer system, rename files, move files, etc.

Processing logic receives responses to the command from the client computer systems (processing block 408). In one embodiment, the responses may be received at different times, as different client computer systems, as well as a server system, may take varying amounts of time to process any given command. Furthermore, in one embodiment, one or more of the received responses may include error messages.

Processing logic determines if responses have been received from all client computer systems (processing block 410). When not all client computer systems have responded to the command, processing logic returns to processing block 408 to await for additional responses. However, when all client computer systems have responded to the command, the responses to the command are reported to the test application (processing block 412). In one embodiment, processing logic may report the responses to the test application as the responses are received.

Processing logic determines if there are additional commands in the test application (processing block 414). When there are additional commands in the test application, processing logic returns to processing block 404 and the test command is forwarded to a testing controller for distribution to two or more client computer systems. However, when there are no additional test commands, the process ends.

Figure 5:
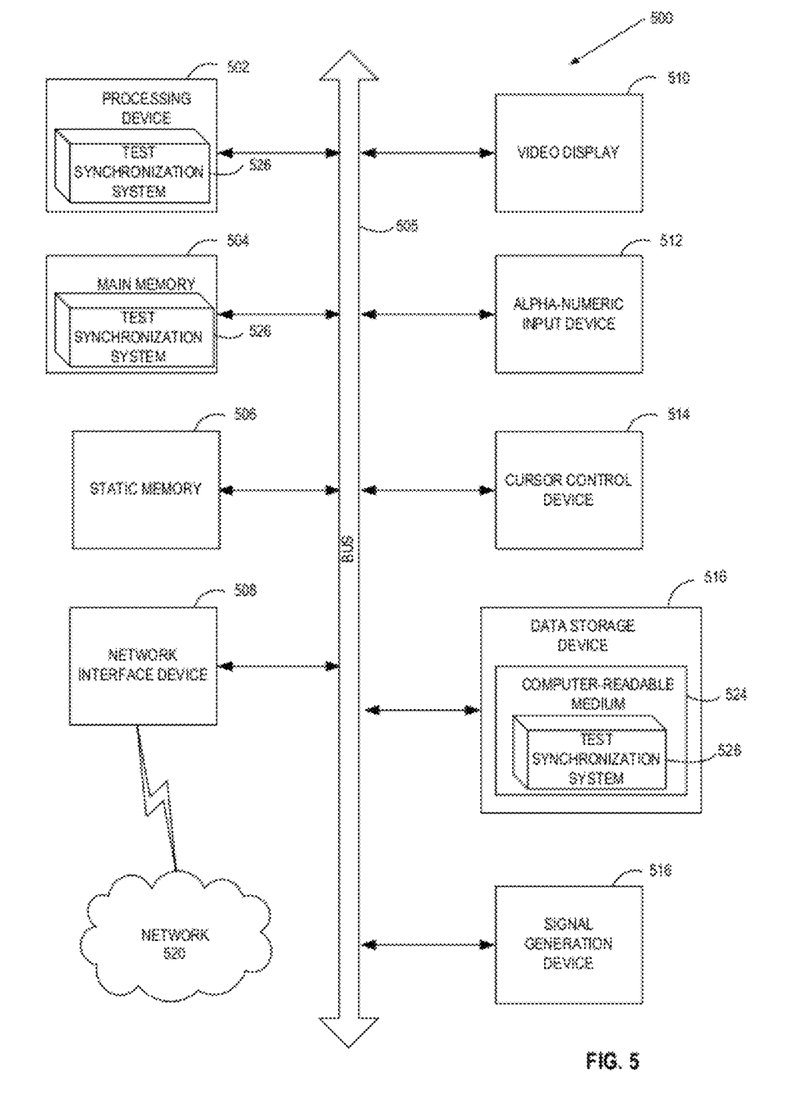
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 516, which communicate with each other via a bus 505.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processing device implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the test synchronization system 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 516 may include a computer-readable storage medium 524 on which is stored one or more sets of instructions (e.g., the test synchronization system 526) embodying any one or more of the methodologies or functions described herein. The test synchronization system 526 may also reside, completely or at least partially, within the main memory 504 and/or within the processing device 502 during execution thereof by the computer system 500, the main memory 504 and the processing device 502 also constituting computer-readable storage media. The test synchronization system 526 may further be transmitted or received over a network 520 via the network interface device 508.

While the computer-readable storage medium 516 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receive", "distribute", "report", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:

1. A method comprising:
   receiving, by a testing proxy executing by a processing device, a plurality of commands from a test application;
   distributing, by the testing proxy and over a network, a first command from the plurality of commands to a plurality of client computer systems to be executed in parallel on the plurality of client computer systems, each client computer system to issue the first command to a server computer system to detect an error at the server computer caused by distributing the first command to the plurality of client computer systems;
   determining whether all of the plurality of client computer systems have completed execution of the first command; and
   in response to determining that all of the plurality of client computer systems have completed the execution of the first command, distributing, by the testing proxy, a second command from the plurality of commands to each of the plurality of client computer systems over the network, wherein the second command is to be executed on the plurality of client computer systems in parallel.

2. The method of claim 1, wherein a same command for each of the received plurality of commands is distributed at a same time to all of the plurality of client computer systems.

3. The method of claim 1 further comprising reporting to the test application responses received from the plurality of client computer systems for commands issued to the server computer system.

4. The method of claim 1, wherein the test application issues graphical user interface commands to test a client-based graphical user interface application.

5. The method of claim 4, wherein the graphical user interface commands issued by the test application simulate user commands.

6. The method of claim 4, wherein the graphical user interface commands issued by the test application are to change a state of data maintained at the server computer system.

7. The method of claim 1, wherein at least one of the received plurality of commands forces error conditions at the server computer system when issued at a same time by two or more of the plurality of client computer systems.

8. The method of claim 1, wherein the test application is an application to test two or more client computer systems.

9. A non-transitory computer readable storage medium comprising instructions, that when executed by a processing device, cause the processing device to:
   receive, by the processing device executing a testing proxy, a plurality of commands from a test application;
   distribute, by the processing device executing the testing proxy and over a network, a first command from the plurality of commands to a plurality of client computer systems to be executed in parallel on the plurality of client computer systems, each client computer system to issue the first command to a server computer system to detect an error at the server computer caused by distributing the first command to the plurality of client computer systems;

determine whether all of the plurality of client computer systems have completed execution of the first command; and in response to a determination that all of the plurality of client computer systems have completed the execution of the first command, distribute, by the testing proxy, a second command from the plurality of commands to each of the plurality of client computer systems over the network, wherein the second command is to be executed on the plurality of client computer systems in parallel.

10. The computer readable storage medium of claim 9, wherein a same command for each of the received plurality of commands is distributed at a same time to all of the plurality of client computer systems.

11. The computer readable storage medium of claim 9, wherein the processing device is further to report to the test application responses received from the plurality of client computer systems for commands issued to the server computer system.

12. The computer readable storage medium of claim 9, wherein the test application issues graphical user interface commands to test a client-based graphical user interface application.

13. The computer readable storage medium of claim 12, wherein the graphical user interface commands issued by the test application simulate user commands.

14. The computer readable storage medium of claim 12, wherein the graphical user interface commands issued by the test application are to change a state of data maintained at the server computer system.

15. The computer readable storage medium of claim 9, wherein at least one of the received plurality of commands forces error conditions at the server computer system when issued at a same time by two or more of the plurality of client computer systems.

16. The computer readable storage medium of claim 9, wherein the test application is an application to test two or more client computer systems.

17. A system comprising:
a memory; and
a processing device operatively coupled with the memory to execute a testing proxy to:
receive a plurality of commands from a test application,
distribute over a network a first command from the plurality of commands to a plurality of client computer systems to be executed in parallel on the plurality of client computer systems, each client computer system to issue the first command to a server computer system to detect an error at the server computer caused by distributing the first command to the plurality of client computer systems,
determine whether all of the plurality of client computer systems have completed execution of the first command; and
in response to a determination that all of the plurality of client computer systems has completed the execution of the first command, distribute a second command from the plurality of commands to each of the plurality of client computer systems over the network, wherein the second command is to be executed on the plurality of client computer systems in parallel.

18. The system of claim 17, wherein a same command for each of the received plurality of commands is distributed at a same time to all of the plurality of client computer systems.

19. The system of claim 17, wherein the processing device is further to report responses received from the plurality of client computer systems for commands issued to the server computer system to the test application.

20. The system of claim 17, wherein the test application is to issue graphical user interface commands to test a client-based graphical user interface application.

* * * * *